(12) United States Patent
Klinger et al.

(10) Patent No.: US 8,816,901 B2
(45) Date of Patent: Aug. 26, 2014

(54) CALIBRATION TO IMPROVE WEATHER RADAR POSITIONING DETERMINATION

(75) Inventors: Eric C. Klinger, Monroe, WA (US); Karsten Isaacson, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 13/486,727

(22) Filed: Jun. 1, 2012

(65) Prior Publication Data
US 2013/0321197 A1 Dec. 5, 2013

(51) Int. Cl.
*G01S 13/00* (2006.01)
*G01S 7/40* (2006.01)

(52) U.S. Cl.
USPC ........... 342/174; 342/26 R; 342/165; 342/175

(58) Field of Classification Search
USPC ................ 342/26 R, 26 A, 26 B, 26 C, 26 D, 342/165–175; 343/757–766
See application file for complete search history.

(56) References Cited

U.S. PATENT DOCUMENTS

| | | | |
|---|---|---|---|
| 3,984,837 A * | 10/1976 | Tatnall ........................... | 343/705 |
| 4,536,685 A * | 8/1985 | Fattal et al. ............... | 318/400.04 |
| H104 H * | 8/1986 | Hung et al. .................... | 341/115 |
| 5,196,774 A * | 3/1993 | Baciak et al. ................. | 318/569 |
| 5,203,220 A * | 4/1993 | Lerman .......................... | 74/5.22 |
| 5,557,285 A * | 9/1996 | Bender et al. ................. | 342/359 |
| 5,594,460 A * | 1/1997 | Eguchi .......................... | 343/765 |
| 6,268,822 B1 * | 7/2001 | Sanders et al. ................. | 342/54 |
| 6,615,117 B2 * | 9/2003 | Li et al. ............................ | 701/13 |
| 6,816,112 B1 * | 11/2004 | Chethik .................... | 342/357.31 |
| 7,095,376 B1 * | 8/2006 | Timothy et al. ............... | 343/705 |
| 7,199,749 B2 | 4/2007 | Greneker, III et al. | |
| 7,256,411 B2 | 8/2007 | Mizes et al. | |
| 7,333,064 B1 * | 2/2008 | Timothy et al. ............... | 343/705 |
| 8,077,080 B2 * | 12/2011 | Lam et al. ..................... | 342/174 |
| 8,586,901 B2 * | 11/2013 | Kesselring ................... | 244/3.19 |

(Continued)

FOREIGN PATENT DOCUMENTS

| | | |
|---|---|---|
| CN | 200810032383.5 | 1/2008 |
| DE | 10233155 A1 | 7/2002 |
| EP | 2230488 A1 | 9/2010 |

OTHER PUBLICATIONS

Search Report from the counterpart European patent application No. 13166711.5 dated Aug. 26, 2013, 3 pages.
Examination Report from counterpart European Application No. 13166711.5, dated Oct. 1, 2013, 5 pp.
Response to Examination Report from counterpart European application No. 13166711.5, filed on Feb. 3, 2014, 15 pp.

(Continued)

*Primary Examiner* — Peter Bythrow
(74) *Attorney, Agent, or Firm* — Shumaker & Sieffert, P.A.

(57) ABSTRACT

A method of calibrating antenna-position detection associated with a radar system, the radar system including a first gimbal and a first angle sensor configured to detect an angular position of the first gimbal, includes mounting a second angle sensor to the first gimbal configured to detect an angular position of the first gimbal. The first gimbal is rotated through each angular position of a set of the angular positions. A first set of data is generated with the first angle sensor that characterizes a detected angular position of the first gimbal. A second set of data is generated with the second angle sensor that characterizes a detected angular position of the first gimbal. A third data set is determined comprising differences, between the first and second data sets, in detected angular position at each first-gimbal angular position. The third data set is stored in a memory device.

14 Claims, 6 Drawing Sheets

(56) References Cited

U.S. PATENT DOCUMENTS

| | | |
|---|---|---|
| 2003/0075641 A1 | 4/2003 | Klesadt et al. |
| 2003/0093194 A1* | 5/2003 | Li et al. .................... 701/13 |
| 2006/0097108 A1* | 5/2006 | Liu et al. .................. 244/79 |
| 2007/0288165 A1* | 12/2007 | Eckert et al. .............. 701/220 |
| 2008/0129242 A1* | 6/2008 | Liu et al. .................. 318/605 |
| 2010/0241381 A1* | 9/2010 | Lam et al. ................. 702/86 |
| 2010/0245196 A1* | 9/2010 | Miron ....................... 343/763 |

OTHER PUBLICATIONS

Hung et al., Digital Resolver Compensation Technique, United States Statutory Invention Registration, Reg. No. H104, Published Aug. 5, 1986.

XianQin Wang SheYong linWei He BeiChuan Zhu, A Simple Based on DSP Antenna Controller of Weather Radar, DPR Lab Chengdu Information technology University Chengdu SC 610041, 1997, pp. 1071-1074.

* cited by examiner

CALIBRATION TO IMPROVE WEATHER RADAR POSITIONING DETERMINATION

BACKGROUND OF THE INVENTION

Most weather-radar precision performance is affected by the quality of the angular sensor (e.g., resolver) used to determine pointing accuracy of an antenna sensor oriented by one or more gimbals, for example, to which the antenna sensor is attached. FIG. 1 illustrates an exemplary dual-axis radar-scanning assembly 10. The assembly 10 includes a base member 20 supporting a first gimbal 30, which rotates about an axis x, and a second gimbal 40, which rotates about an axis y generally perpendicular to axis x. A frame 50, which is configured to support an antenna sensor (not shown in FIG. 1), may be mounted to the first gimbal 30, so as to be rotated in a two-dimensional scan field by the gimbals 30, 40. The assembly may include one or more resolvers (not shown in FIG. 1) functioning to provide signals indicating the angular position of the gimbals 30, 40.

As a consequence of the angular sensor used and its inherent precision, or lack thereof, the reported position has a defined amount of error associated with it. High-precision angular sensors are very costly and would impact the unit cost and marketability of the radar system. Moreover, simple calibration procedures, such as using a digital protractor, have been used to define the zero position (boresight) of a single-axis or multiple-axes antenna-gimbal assembly. This is a one-point calibration approach that typically does not provide a sufficient level of calibration accuracy. As such, it would be advantageous to use lower-cost sensors, with their typically lower-precision capability, with high-precision results.

One solution, as provided by U.S. Pat. No. 8,077,080, which is hereby incorporated by reference, uses a high-resolution calibration table with no specification that consecutive values in the table be sufficiently continuous. If a discontinuity of consecutive values in the table exists, the antenna control system may generate a large corrections causing high power consumption.

SUMMARY OF THE INVENTION

The present invention provides methods of providing smooth and accurate antenna positioning. An exemplary radar system includes a first gimbal and a first angle sensor configured to detect an angular position of the first gimbal, and includes mounting a second angle sensor to the first gimbal that is configured to detect an angular position of the first gimbal. The first gimbal is rotated through each angular position of a set of the angular positions. A first set of data is generated with the first angle sensor that characterizes a detected angular position of the first gimbal. A second set of data is generated with the second angle sensor that characterizes a detected angular position of the first gimbal. A third data set is determined comprising differences, between the first and second data sets, in detected angular position at each first-gimbal angular position. The third data set is stored in a memory device. A smoothing function is applied to the data stored in the memory device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In an embodiment of the present invention, to attain improved precision of a weather radar system without the added costs of high-precision sensors, a lesser precision sensor is "characterized" with a higher precision sensor, the resultant data is stored onboard the radar system (e.g., in a database) and the stored data is smoothed by a smoothing function. The smoothing function improves system performance. Sensor construction and assembly in a higher-level system dictate the level of precision that the sensor is capable of. These effects are typically repeatable throughout the scan region of the radar antenna. Where a repeatable error exists, a higher precision sensor is able to measure that error throughout the scan region and to store the data representing such error for later use.

In an embodiment of the present invention, an encoder, of a higher precision, is used to measure the error of the resolvers used in the antenna's positioner. The encoder measures error during calibration of the antenna's scanning assembly to provide data that can be used onboard the radar system to compensate for the error, so as to provide onboard a true orientation of the resolvers, as measured during calibration, in relation to the erroneous orientation reported onboard by the resolvers.

An embodiment of the present invention includes a method of improving position-control accuracy of a weather-radar antenna control system through calibration and data smoothing. An embodiment of the present invention includes a calibration system, used to characterize the target system, and associated software components required to download and smooth calibration data that are stored in a table. The target system, calibration system, and software components provide a method of improving system performance by compensating for deterministic position feedback error introduced by, for example, structural elements and position feedback sensors.

Figure 1:
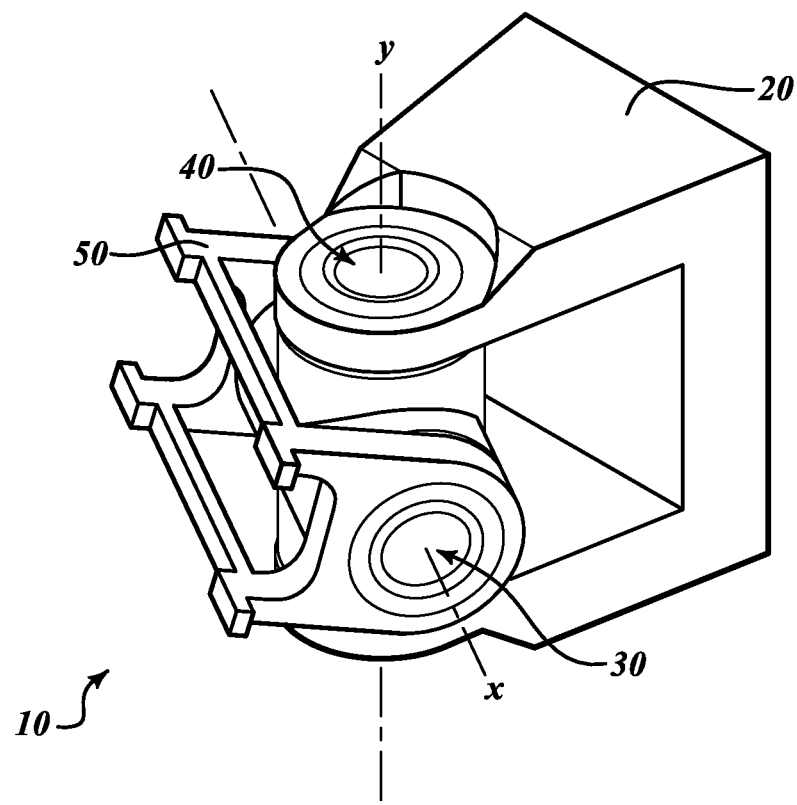
FIG. 1 illustrates an exemplary conventional dual-axis radar-scanning assembly.
Figure 2:
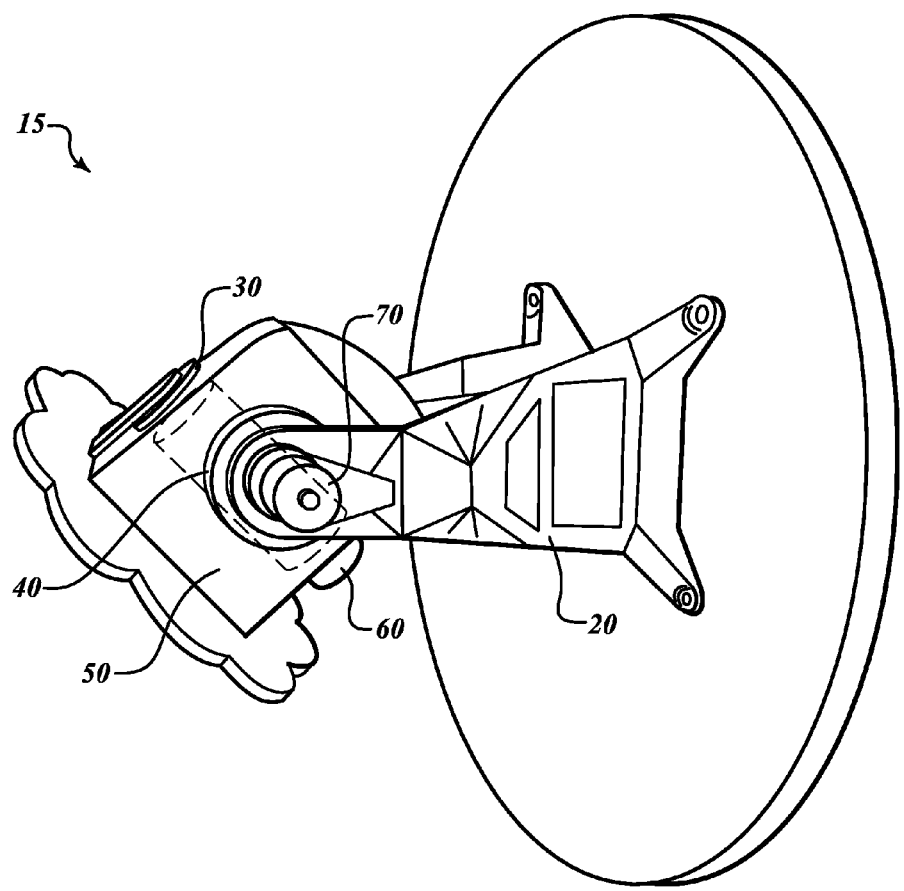
FIG. 2 illustrates an approach to calibrating a dual-axis radar-scanning assembly according to an embodiment of the invention.

Referring to FIG. 2, illustrated is an approach, according to an embodiment of the present invention, to calibrating a dual-axis radar-scanning assembly 15, similar to assembly 10 illustrated in FIG. 1, in which like elements are designated by like reference numerals.

Figure 3:
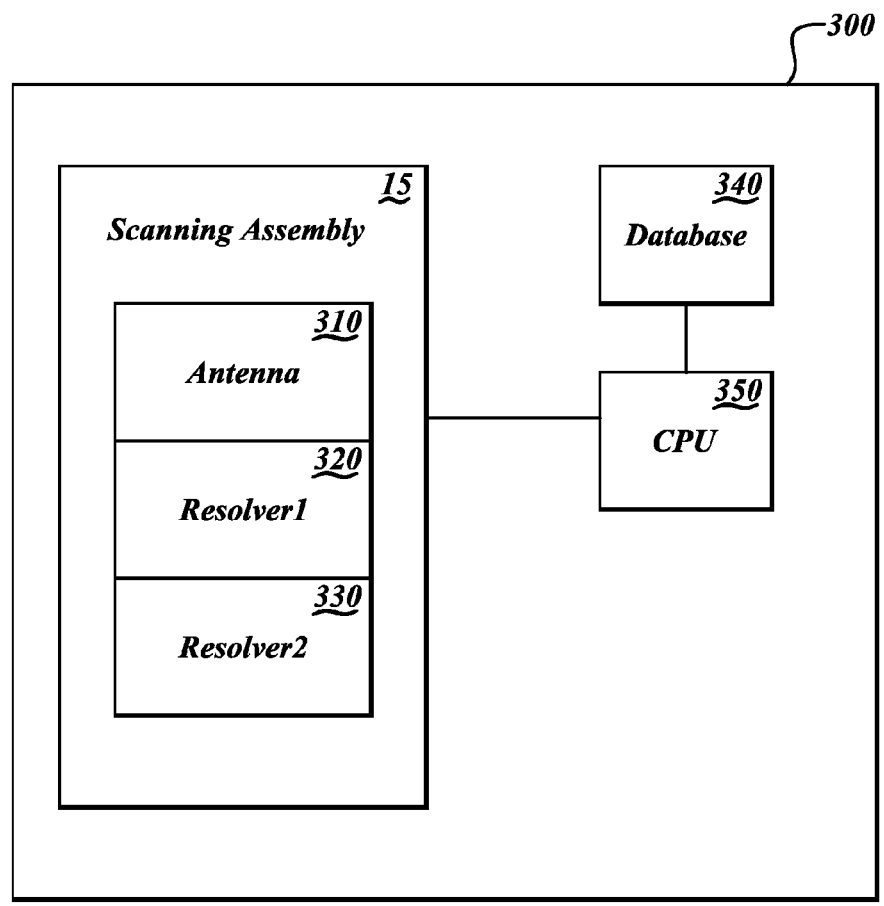
FIG. 3 illustrates a radar system according to another embodiment of the present invention.

The approach illustrated in FIG. 2 includes calibrating antenna-position detection associated with the assembly 15, which is to be part of a radar system 300 (FIG. 3). The first and second gimbals 30, 40 are configured to rotate through a respective range of angular positions. Angle sensors associated with the assembly 15, such as resolvers 320, 330 (FIG. 3), are configured to detect the angular positions of the first and second gimbals 30, 40.

The illustrated approach includes mounting high-precision angle sensors, such as optical-encoder sensors 60, 70, to end portions of the first gimbal 30 and second gimbal 40, respectively. The encoder sensors 60, 70 are configured to detect respective angular positions of the first and second gimbals 30, 40. The optical encoder sensors 60, 70 and associated components employed in an embodiment of the present invention may include, or be similar in functionality to, the sensor system having model number L-9517-9155-02A produced by RENISHAW®. In the illustrated embodiment of the present invention, a sensor-ring portion of the encoder sensors 60, 70 is mounted onto respective ones of the axes of the end portions of first and second gimbals 30, 40.

During the calibration process, according to an embodiment of the invention, each of the first and second gimbals 30, 40 is rotated through a predetermined set of angular positions. As the first and second gimbals 30, 40 are rotated, first data sets are generated by the resolvers 320, 330 that characterize the detected angular position of the first and second gimbals 30, 40 at each angular position through which they are rotated. At the same time, second data sets are generated by the encoder sensors 60, 70 that characterize the detected angular position of the first and second gimbals 30, 40 at each angular position through which they are rotated.

These first and second data sets are provided to a processing device (not shown) that is configured to determine a third data set characterizing errors in the angular-position measurements provided by the resolvers 320, 330 as determined from the measurements provided by the encoder sensors 60, 70. As such, these errors may be characterized as the differences, between the first data set and second data set, in detected angular position at each angular position through which the first and second gimbals 30, 40 are rotated. As discussed in greater detail below, the third data set is subsequently stored in a memory device, such as a database 340 (FIG. 3) onboard an aircraft or other vehicle in which the assembly 15 will be deployed.

Referring now to FIG. 3, illustrated is a radar system 300, according to an embodiment of the present invention. The radar system 300 includes the scanning assembly 15 illustrated in FIG. 2, not including the encoder sensors 60, 70. The system 300 includes an antenna element 310 mounted to the first and second gimbals 30, 40, the database 340, and a processing element 350.

Figure 4:
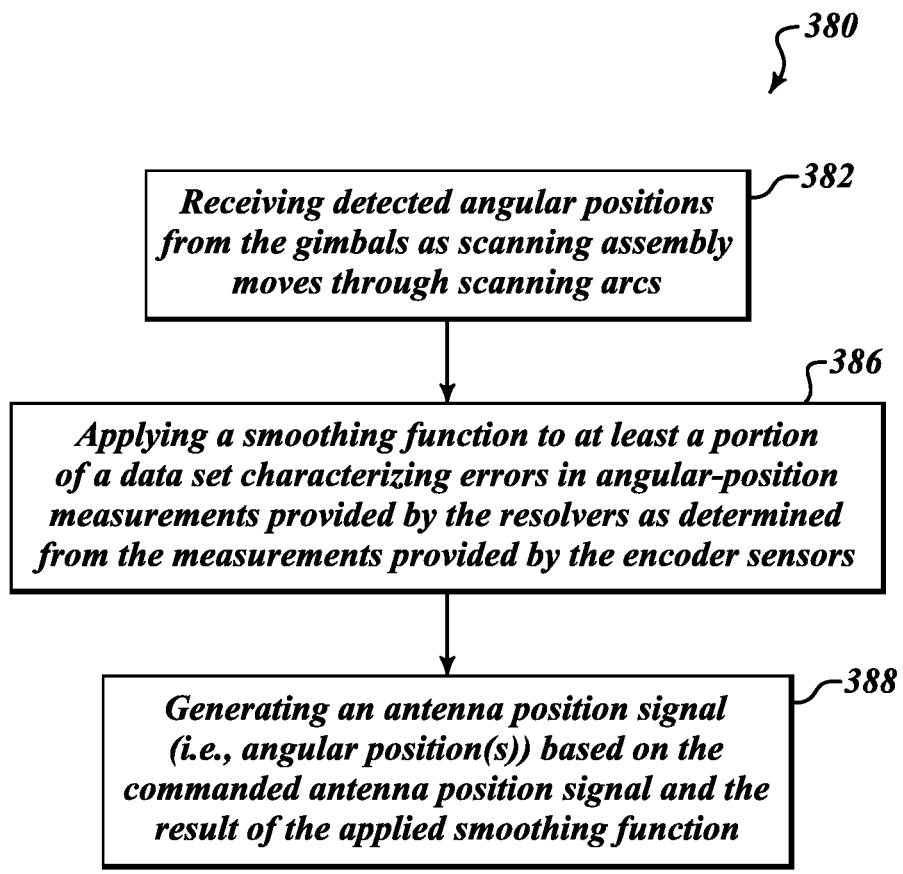
FIG. 4 shows a flowchart of an exemplary process performed by the system shown in FIG. 3.

In operation, as shown in a process 380 of FIG. 4, the database 340 includes the third data set characterizing errors in the angular-position measurements provided by the resolvers 320, 330 as determined from the measurements provided by the encoder sensors 60, 70. As the assembly 15 moves through its scanning arcs, the processing element 350 receives from the resolvers 320, 330 detected angular positions of the first and second gimbals 30, 40, see block 382. Then, the processing element 350 applies a smoothing function to the third data set, see block 386. Next, the processing element 350 determines corrected, and more accurate, angular positions of the first and second gimbals 30, 40 using the results of the smoothing function, see block 388. These error-compensated determinations are then provided by the processing element 350 to weather-monitoring avionics/electronics (not shown), or the like, aboard the aircraft or other vehicle in which the illustrated system 300 is implemented. The corrected angular position is used for the reported position or is used in the antenna drive command.

In one embodiment of the present invention, the smoothing operation is performed on demand (i.e., at runtime). First, a command position signal is received at the processor. The processor then performs a smoothing operation on only the nearest values that are stored in the calibration table, based on the command position signal. Then, the antenna is moved, based on the smoothed nearest values and the command position signal.

An exemplary smoothing operation/function is polynomial curve fitting of the n nearest neighbors. In another embodiment, a linear interpolation function is used to smooth two consecutive calibration table values using a line. Other smoothing functions may be used.

Figure 5:
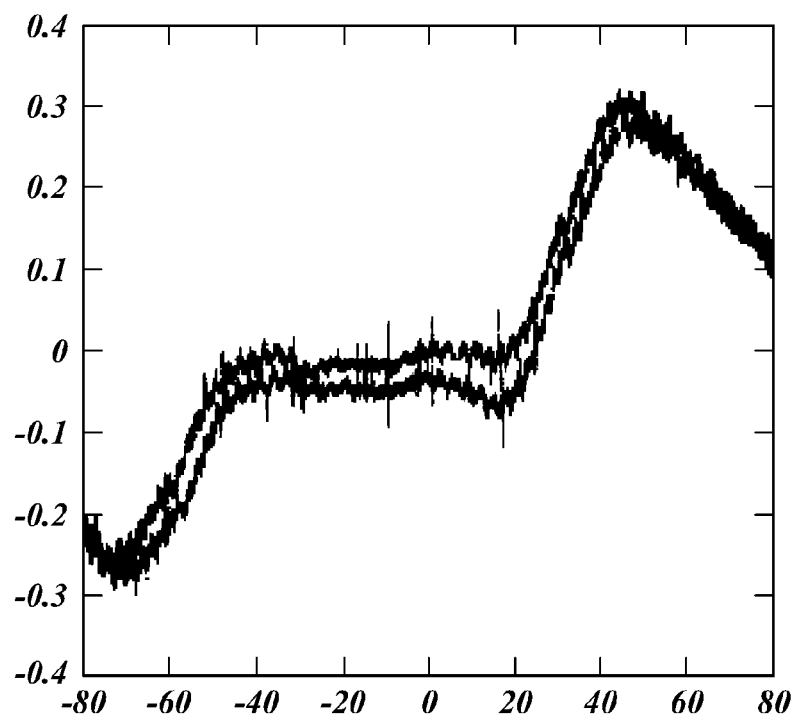
FIGS. 5-8 illustrate the effect of the calibration procedure of an embodiment of the present invention on a radar system and of the prior art.
Figure 6:
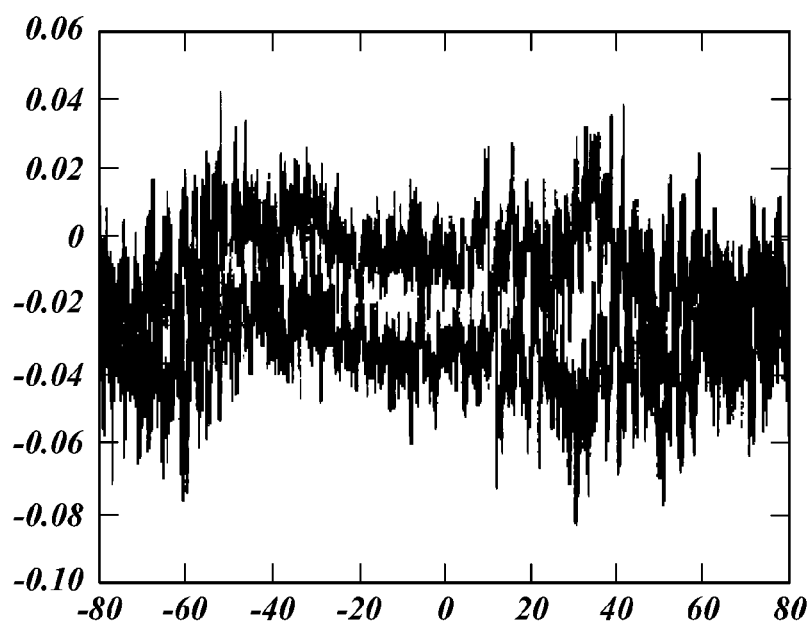
Figure 7:
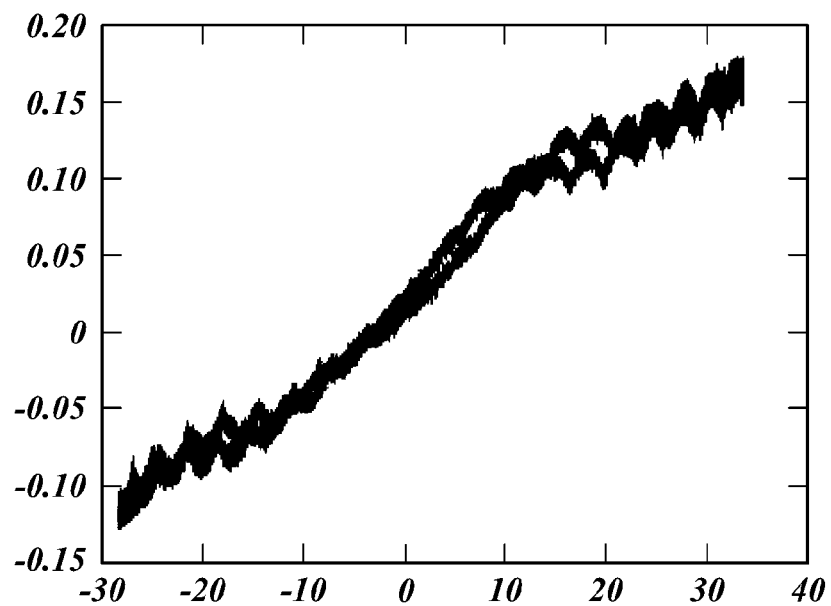
Figure 8:
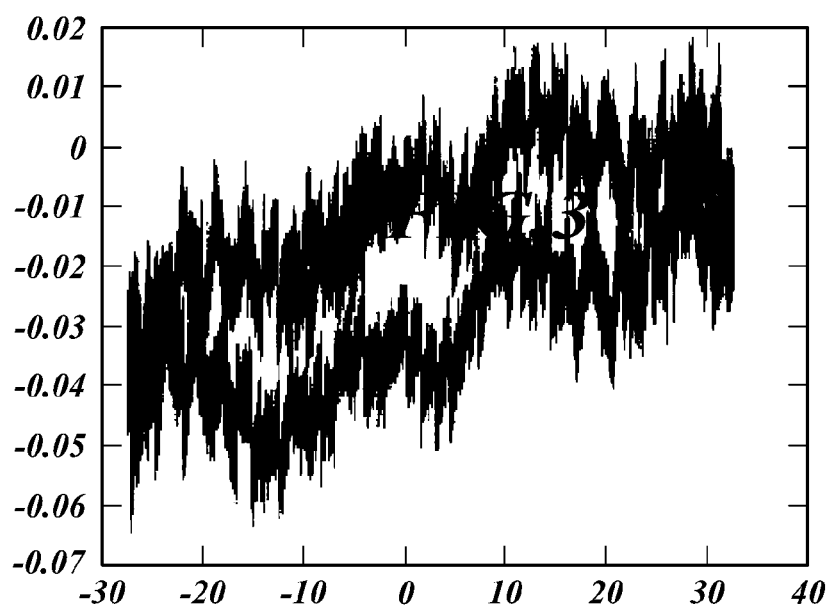

FIGS. 5-8 illustrate the effect of the herein-described calibration procedure of an embodiment of the present invention on a radar system. FIGS. 5 and 6 show the azimuth-axis effect and FIGS. 7 and 8 show the elevation-axis effect. The openings are due to latencies in the reporting path and the speed of the antenna commanded. As can be seen from FIG. 5, the error before optical calibration (zero-point calibration with the digital protractor only) is ±0.3°; as shown in FIG. 6, after optical calibration (zero-point cal +optical encoder protocol) the azimuth error is reduced to ±0.07°. The elevation error is similarly affected: as can be seen from FIG. 7, before high-resolution calibration, the error is ±0.17°; as shown in FIG. 8, after high-resolution calibration, the error is ±0.06°.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of calibrating antenna-position detection associated with a radar system, the radar system including a first gimbal configured to rotate through a range of angular positions and to which an antenna element is coupled, and a first angle sensor configured to detect an angular position of the first gimbal, the method comprising the steps of:
    storing a calibration table in a memory device coupled to the first angle sensor;
    at a processing device,
        applying a smoothing operation to at least pieces of data stored in the calibration table;
        receiving a commanded antenna position signal;
        generating an antenna position signal based on the commanded antenna position signal and the result of the applied smoothing operation; and
        using the generated antenna position signal for analysis of transmitted and received radar information.

2. The method of claim 1, wherein the radar system further comprises a second angle sensor mounted to the first gimbal, the second angle sensor being configured to detect an angular position of the first gimbal, and wherein storing comprises:
    rotating the first gimbal through each angular position of a predetermined set of the angular positions;
    generating a first set of data with the first angle sensor, the first set of data characterizing a detected angular position of the first gimbal at each angular position through which the first gimbal is rotated;
    generating a second set of data with the second angle sensor, the second set of data characterizing the detected angular position of the first gimbal at each angular position through which the first gimbal is rotated;
    determining, with the processing device, a third data set comprising differences, between the first data set and second data set, in the detected angular position at each angular position through which the first gimbal is rotated; and
    storing the third data set in the memory device electronically coupled to the first angle sensor,
    wherein the third data set comprises the calibration table.

3. The method of claim 2, wherein the first angle sensor comprises a resolver.

4. The method of claim 2, wherein the second angle sensor comprises an optical encoder.

5. The method of claim 2, wherein the second angle sensor has a higher accuracy rating than the first angle sensor.

6. The method of claim 2, wherein the first gimbal comprises an end portion, and the second angle sensor is mounted to the end portion.

7. The method of claim 2, wherein the radar system comprises the memory device.

8. A radar system comprising:
a first gimbal configured to rotate through a range of angular positions;
an antenna element coupled to the first gimbal;
a first angle sensor configured to detect an angular position of the first gimbal;
a second angle sensor configured to detect the angular position of the first gimbal;
a memory device comprising a third data set comprising differences, between a first data set and a second data set, in detected angular positions at each angular position of a predetermined set of angular positions through which the first gimbal is rotated, the first data set being generated with the first angle sensor and characterizing a detected angular position of the first gimbal at each angular position through which the first gimbal is rotated, the second data set being generated with the second angle sensor and characterizing a detected angular position of the first gimbal at each angular position through which the first gimbal is rotated;
a processing element configured to:
receive a commanded position signal;
apply a smoothing operation to the least a portion of the third data set; and
determine a corrected angular position of the first gimbal based on the at least a portion of the third data set; and
a motor assembly configured to position the antenna based on the determined corrected angular position.

9. The system of claim 8, wherein the first angle sensor comprises a resolver.

10. The system of claim 8, wherein the second angle sensor comprises an optical encoder.

11. The system of claim 8, wherein the second angle sensor has a higher accuracy rating than the first angle sensor.

12. The system of claim 8, wherein the first gimbal comprises an end portion and the second angle sensor is mounted to the end portion.

13. The system of claim 8, wherein the first gimbal is configured to rotate about a first axis having a first orientation, the system further comprising:
a second gimbal configured to rotate through a range of angular positions and to which the antenna element is coupled, the second gimbal rotating about a second axis having a second orientation different from the first orientation; and
a third angle sensor configured to detect an angular position of the second gimbal, wherein the memory device further comprises a sixth data set comprising differences, between a fourth data set and a fifth data set, in detected angular positions at each angular position of a predetermined set of angular positions through which the second gimbal is rotated, the fourth data set being generated with the third angle sensor and characterizing the detected angular position of the second gimbal at each angular position through which the second gimbal is rotated, the fifth data set being generated with a fourth angle sensor and characterizing the detected angular position of the second gimbal at each angular position through which the second gimbal is rotated, and the processing element is further configured to receive from the third angle sensor the detected angular position of the second gimbal and to determine, based on the sixth data set, a corrected angular position of the second gimbal.

14. A method of calibrating antenna-position detection associated with a radar system, the radar system including a first gimbal configured to rotate through a range of angular positions and to which an antenna element is coupled, and a first angle sensor configured to detect an angular position of the first gimbal, the method comprising:
storing a calibration table in a memory device;
at a processing device,
receiving a commanded antenna position signal;
applying a smoothing operation to adjacent values stored in the calibration table based on the received commanded antenna position signal;
generating an antenna position signal based on the commanded antenna position signal and the result of applying the smoothing operation; and
using the generated antenna position signal for analysis of transmitted and received radar information.

* * * * *

UNITED STATES PATENT AND TRADEMARK OFFICE
CERTIFICATE OF CORRECTION

PATENT NO.        : 8,816,901 B2
APPLICATION NO.   : 13/486727
DATED             : August 26, 2014
INVENTOR(S)       : Eric C. Klingler and Karsten Isaacson Page 1 of 1

It is certified that error appears in the above-identified patent and that said Letters Patent is hereby corrected as shown below:

Title page, item (12): ...Klinger et al., should read "...Klingler et al."

Title page, item (75) Inventors: Eric C. Klinger,..., should read "Inventors: Eric C. Klingler,..."

Signed and Sealed this
Twelfth Day of May, 2015

Michelle K. Lee
*Director of the United States Patent and Trademark Office*